United States Patent Office 3,228,891
Patented Jan. 11, 1966

3,228,891
METHOD FOR PRODUCING SPHERICAL
BAUXITE ADSORBENT GRANULES
James B. Duke, Metuchen, N.J., assignor to Minerals &
Chemicals Philipp Corporation, Menlo Park, N.J., a
corporation of Maryland
No Drawing. Filed Aug. 17, 1962, Ser. No. 217,532
10 Claims. (Cl. 252—448)

This invention relates to the agglomeration of ore and relates, more particularly, to hard compact active alumina pellets and their production from bauxite fines.

A substantial percentage of the bauxite ore that is mined ends up in the form of virtually useless fines, i.e., particles finer than about 60 mesh. These fines are for the most part the by-product of crushing operations employed in producing bauxite granules which are calcined (activated) for use as adsorbent contact masses or as carriers for catalytic material.

In attempting to utilize bauxite fines, considerable effort has been directed to the development of techniques for compacting the bauxite fines into granular form suitable for use in adsorptive contact processes or as a carrier for catalytic material. Thus, for example, bauxite fines have been pugged with water or water containing binding ingredients such as colloidal silica and the pugged mixtures extruded into strands which are cut into pellets, crushed and then calcined. Certain binding solutions have led to the formation from bauxite fines of calcined extruded pellets whose hardness compares favorably with the hardness of calcined crushed whole ore. However, the process requires the use of expensive extrusion equipment. Moreover, the formation of by-product fines is inherent in the operation and this adversely affects the economics of the process. Still another limitation to the extrusion process is that granules obtained from the fines are irregular in shape, rather than being in the spherical form that is generally preferred in percolation processes or in carrier applications. Thus, extruded bauxite granules, like bauxite granules obtained by crushing and sizing whole ore, are not competitive in some uses with synthetic sorbents which are readily provided in spherical form by pan granulation processes or the like. While it is possible to round green extruded bauxite pellets produced from bauxite fines, the additional processing step adds to the expense of the extrusion process.

It has been suggested in U.S. 2,391,116 to Ashley to agglomerate bauxite fines directly in a pug mill using a sodium silicate solution as a binder. The moist agglomerates are then fired, washed to remove alkali and again fired to activate the agglomerate. The hardness of resulting product has been found to leave much to be desired. Moreover, the process is inefficient in that a part of the pugged fines is not agglomerated but remains as fines which must be treated with additional silicate solution to effect their agglomeration in a subsequent pugging step. Moreover, the process is uneconomical in that a washing step is required in addition to two distinct heat treatments, one before washing and one after.

Accordingly, it is a principal object of this invention to provide a simple economical process for agglomerating bauxite fines into hard spherical pellets.

A more particular object of this invention is to compact bauxite fines into hard spherical pellets virtually free from by-product fines or dust.

Still another object is the provision of a method for compacting bauxite fines directly into round granules without the need for extrusion and auxiliary pellet rounding equipment.

Another object is the provision of active alumina pellets in spherical form, the pellets being characterized by noteworthy attrition resistance.

Further objects and advantages will be readily apparent from a description of this invention which follows.

Stated briefly, in accordance with this invention, hard activated bauxite pellets in the form of dust-free spheres are produced by pugging bauxite fines with a small amount of a concentrated aqueous solution of sodium hydroxide and then adjusting the liquid content of the alkali-treated fines with a restricted quantity of water, sufficient to moisten the fines to a liquid content at which the fines agglomerate with subsequent pugging into spherical pellets. The green spheres, without a preliminary washing step, are then calcined out of contact with combustion gases, thereby forming activated bauxite spheres of exceptional hardness.

From this brief description of the invention, it may be seen that an essential feature of this invention resides in the use of sodium hydroxide as the alkaline binding agent. Other alkalies, such as for example, sodium carbonate, will not suffice in that the ultimate bauxite spheres will not possess the hardness of sodium hydroxide bonded spheres. Another feature of the process resides in adjusting the liquid content of the bauxite fines to effect the granulation after addition of alkali solution is completed. Yet another feature of the process is that the thermal activation treatment (calcination) of the caustic bonded spheres must be carried out in atmosphere free from combustion gases, i.e., calcination must be accomplished in an indirectly fired calciner. As a result of failure to calcine the spheres out of contact with combustion gases, such as $CO_2$, or the failure to add sodium hydroxide before adjusting the liquid content of the fines to make them amenable to ball formation, the hardness of the calcined bauxite spheres may be no better than the hardness of spheres obtained without incorporating any alkali binding agent into the water during the agglomeration process. It is also necessary to the operativeness of this process to avoid washing the spheres before calcining them since washing is markedly detrimental to product hardness.

Spherical bauxite pellets produced in accordance with this invention compare favorably in adsorptive capacity with commercial bauxite granules obtained from crushed whole ore. These pellets are useful as adsorbent contact masses or as carriers for catalytically active material. The hardness (attrition resistance) of the spherical pellets of this invention represents a significant improvement over the hardness of commercial activated bauxite granules. Therefore, pellets of this invention will resist breakdown under conditions of use which will cause the commercial granules to disintegrate.

The bauxite fines employed in carrying out this invention should be substantially free from particles coarser than about 70 mesh and should contain, for the most part, particles 100 mesh or finer. These fines may be a by-product in the crushing and screening of whole ore to produce granular grades of bauxite. If desired, bauxite ore can be intentionally crushed to the desired fine particle size.

The fines employed in the process are uncalcined in the sense that they contain all or substantially all of their native water of hydration. The naturally occurring ore usually has a volatile matter content of the order of 40% to 50%, the term "volatile matter" (or V.M.) referring to the weight percentage of a material that is eliminated by heating the material to essentially constant weight at 1800° F. In the case of bauxite, volatile matter is chiefly water. The fines may be dried to a V.M. at which the free moisture or physically held water is substantially eliminated from the bauxite and the water of crystallization is left intact. This V.M. will depend on the purity of the ore and is about 25% to 33% for high purity ore. Bauxite which has been activated by calcination at temperatures of the order of 600° F. to 1200° F. to a V.M. of the order of 2% to 6% is not amenable to the practice of the present invention.

The term "bauxite" encompasses distinct hydrates of alumina. Some bauxites are characterized by containing as the chief mineral constituent, diaspore, an alumina monohydrate. Others consist principally of alpha alumina trihydrate (so-called "gibbsite"). The bauxite utilized in the practice of the present invention is one whose principal mineral constituent is gibbsite. Normally, the bauxite will contain small amounts of siliceous matter in addition to gibbsite, and the $SiO_2$ analysis of the ore will usually be of the order of 3% to 15%, based on the volatile free weight of the ore.

In carrying out the process, a NaOH dosage within the range of about 1% to about 6% is used, NaOH dosage being defined as the weight of 100% NaOH per unit weight of volatile free bauxite fines, expressed on a percentage basis. The preferred NaOH dosage is within the range of 2% to 5%, with particularly good results, in terms of hardness, being obtained with a 3% to 4% dosage. At dosages less than 1% or greater than 6%, the effectiveness of the alkali tends to diminish.

The sodium hydroxide is incorporated into the bauxite fines as a concentrated aqueous solution, e.g., a solution of about 30% to about 50% weight concentration, preferably 40% to 50% weight concentration. Somewhat more dilute sodium hydroxide solutions may be employed. However, the calcined bauxite spheres obtained with these more dilute solutions will be softer than spheres produced when the sodium hydroxide is employed as a solution of about maximum concentration, e.g., about 50%. Obviously, the permissible lower limit to sodium hydroxide concentration will vary with sodium hydroxide dosage and moisture content of the bauxite fines.

In carrying out the process of this invention, the bauxite fines can be pelletized in pug mills of various design. Satisfactory results have been obtained with a match pugger having a single rotating shaft carrying a multiplicity of paddles. Good results have also been realized in continuous pug mills having single or double shafts carrying mixing arms or blades of various design. It is necessary to the success of the process that the mixing of bauxite fines with alkali and water be carried out in a mixer which subjects the fines to a considerable amount of mechanical work.

The alkali solution is slowly added to the bauxite fines, as by a liquid meter or spray device, while the pugger is in operation. After addition of the alkali solution is completed, pugging of the sodium hydroxide treated bauxite fines is continued to insure thorough and uniform impregnation and coating of the individual bauxite particles with the sodium hydroxide solution. At this point of the process, the mass may contain some agglomerates. However, any agglomerates are pulverulent, unlike the coherent plastic bauxite balls or spheres that are formed in the subsequent stage of the process in which the liquid content of the mass is adjusted by addition of an appropriate amount of water. The total quantity of water that is incorporated with the sodium hydroxide coated bauxite fines to bring about the agglomeration of the fines will vary with the V.M. of the starting bauxite, the quantity and nature of impurities present with the bauxite fines, the concentration of the sodium hydroxide solution that has been incorporated into the fines and the design of the pug mill. A suitable quantity of water to add to the alkali coated fines can be determined by simple observation of the change in consistency of the sodium hydroxide treated fines with successive increment of water addition. When uniform balling up of the charge is observed, adequate water has been incorporated into the caustic treated fines. Generally speaking, the quantity of water incorporated into the caustic coated bauxite fines is sufficient to bring the total V.M. of the charge in the pugger to an amount within the limits of about 33% to 38%. Especially good results have been realized by moistening alkali impregnated ground bauxite ore to a V.M. of about 35%. After adjustment of V.M. with water, pugging is continued until all of the bauxite fines have accumulated into spheres and no fines (dust) are present. The size of the bulk of the spheres that are produced will vary somewhat with the design of the pugger that is employed. Mills which have relatively wide arms or paddles and/or low shaft speeds usually produce relatively large spherical pellets, e.g., pellets up to ½". On the other hand, mills with more narrow arms and/or higher shaft speeds usually produce pellets ¼" and smaller. Total pugging time is typically about ½ to 1 hour.

The green spheres are dried somewhat, as to a V.M. of about 20% to 30%, before calcination in order to prevent any particle breakdown which might occur if the green spheres were rapidly brought to calcination temperatures. Drying in the presence of air at about 300° F. for ½ hour has been found satisfactory.

The dried spherical pellets, usually after a sizing step, are calcined at a temperature within the range of about 600° F. to about 1200° F. for a time sufficient to reduce the V.M. of the spheres to an amount within the range of about 1% to about 15%. For most of their principal applications, alkali bonded bauxite pellets activated to a V.M. within the range of about 6% to 10% are preferred. At calcination temperatures below 600° F., the adsorptive capacity of the pellets may leave something to be desired. At calcination above 1200° F., the pellets may sinter and lose surface area, resulting in a loss of adsorptive capacity. Calcination time will depend, of course, on the equipment employed and the efficiency of heat transfer to the spheres. Normally, the calcination time will vary within the range of from about ½ hour to about 24 hours.

Calcination must be carried out in an externally fired furnace or calciner so as to avoid direct contact of the spherical pellets with combustion gases. Muffle furnaces are suitable, as are rotary calciners in which heat is supplied through internal pipes.

The following examples are given to illustrate the production of hard bauxite pellets, in accordance with this invention, and to demonstrate certain critical features of the process.

In the examples, pellet hardness was evaluated by the following test.

A sample of pellets was screened through a 4-mesh screen and then an 8-mesh screen, the 4/8 mesh fraction being used for the test. One hundred grams of the 4/8 mesh pellets were placed in a steel cylinder 4" I.D. by 10" long, along with 14 steel balls of ⅝" diameter. The covered cylinder containing the pellets and steel balls was rotated end-over-end for 16 minutes at 18 r.p.m. and the contents then discharged onto an 8-mesh screen. The pellet fragments were separated into plus 8-mesh and minus 8-mesh fractions and the hardness calculated as indicated below:

$$\frac{\text{Wt. of plus 8-mesh}}{\text{Total weight of both fractions}} \times 100 = \text{Percent hardness}$$

EXAMPLE I

Hard bauxite pellets were obtained, in accordance with this invention, from bauxite fines by the following procedure:

Demerara bauxite ore (principally gibbsite) was pulverized to 89% minus 100 mesh (98% minus 70 mesh, 22% minus 325 mesh) in a ball mill in closed circuit with a sifter. The ore had a V.M. of 24.8% and a F.M. of about 1.4%. (F.M. or free moisture represents the weight percentage of material eliminated by heating the material to essentially constant weight at 220° F.) In the case of bauxite, F.M. is chiefly water.

26.5 pounds of the screened pulverized bauxite fines were charged to a double shaft mixer, 3' long, 1' wide, 1' deep and with 32 paddles on each shaft (Patterson paddle mixer—type GPM Heavy Duty, Continuous Mixer). The machine was operated with a blade gap of ¼" to 1/16". 1.50 pounds of a 50% NaOH solution (a 4% dosage) was metered onto the bauxite fines over a period of 2½ minutes with the shafts running at 86 r.p.m. While operating the shafts at 86 r.p.m., the ingredients were pugged for 10 minutes and 1340 cc. of water added gradually over a period of 25 minutes. The charge was given a final pugging for 10 minutes (total pugging time of 47½ minutes). The resulting spherical pellets, which were mostly ¼" and smaller, were dried at 350° F. for 2 hours. The dried pellets were sifted on 2, 4, 8, 20 and 60 mesh screens. Following is the particle size distribution of the pellets, indicating that most of the pellets were 4/20 mesh and that the product was substantially free from fines (e.g., particles minus 60 mesh).

| Mesh size: | Wt. percent |
| --- | --- |
| +2 | 2.7 |
| 2/4 | 10.7 |
| 4/8 | 29.9 |
| 8/20 | 39.4 |
| 20/60 | 14.6 |
| —60 | 2.7 |

A portion of the 4/8 mesh fraction of the spherical pellets was calcined in a reducing atomsphere at 650° F. to a V.M. of 9.5%. Another portion of the pellets was calcined at 700° F. to a V.M. of 6.9%, producing pellets having B.E.T. surface areas of 241 sq.m./g. and 221 sq.m./g., respectively.

The hardness of the calcined 4/8 mesh size fraction of pellets was compared with the hardness of 4/8 mesh commercial activated bauxite granules obtained by crushing whole Demerara ore, sizing and calcination. The results are summarized in Table I.

*Table I*

HARDNESS OF CALCINED BAUXITE GRANULES

| Calcination | Composition of granules | |
| --- | --- | --- |
| | Crushed ore | NaOH bonded fines |
| At 650° F./2 hr.: | | |
| Hardness, percent | 34 | 89 |
| V.M., percent | 9.5 | 9.4 |
| At 700° F./2 hr.: | | |
| Hardness, percent | 32 | 96 |
| V.M., percent | 6.5 | 6.9 |

Data in Table I show that the caustic bonded bauxite pellets had hardness values of 89% and 96% when calcined at 650° F. and 700° F., respectively, as compared with hardness values of only 34% and 32% for commercial granules of the same size and similar volatile matter content. These results therefore indicate that the spherical pellets of this invention are considerably more attrition-resistant than commercial bauxite granules.

EXAMPLE II

Experiments were conducted to demonstrate the necessity for calcining pugged, caustic bonded green spherical pellets out of direct contact with combustion gases.

Twenty-five pounds of ground minus 60 mesh Demerara bauxite ore was charged to a pug mill. The pugger was started and 1.08 pounds of a 50% NaOH solution (3% dosage) was added to the pugger over a period of 5 minutes by means of a separatory funnel. After addition of the solution, the contents of the mill were plugged for 10 minutes. 1250 cc. of water was gradually added to the charge over a period of 15 minutes while pugging. Balls began forming during water addition. After addition of water was completed, the pugger was maintained in operation for 30 minutes, resulting in complete conversion of the fines into dust-free balls, having the following screen analysis.

SCREEN ANALYSIS

| Mesh: | Percent weight |
| --- | --- |
| +2 | 0.0 |
| 2/4 | 54.2 |
| 4/5 | 17.9 |
| 5/6 | 8.0 |
| 6/8 | 10.4 |
| 8/10 | 6.2 |
| 10/20 | 2.7 |
| 20/60 | 0.3 |
| —60 | 0.3 |

The green pellets were dried at 300° F. for 2 hours. One portion of the dried pellets was calcined at 700° F. in a rotary calciner in an atmosphere of oxidized combustion gases. The 4/8 mesh fraction of these pellets had a hardness value of only 76%. Another portion of the pellets was calcined, in accordance with this invention, in a muffle furnace (externally heated calciner) at 700° F. for ½ hour. The 4/8 mesh fraction of these pellets had a hardness value of 85%, representing a marked improvement over the hardness of pellets activated in the presence of oxidized combustion gases.

EXAMPLE III

An experiment was conducted to demonstrate that in pelletizing bauxite fines with sodium hydroxide and water in a pug mill, it is necessary to add the sodium hydroxide in the form of a concentrated aqueous solution to the bauxite fines before adjusting the liquid content of the bauxite fines with water.

(a) Twenty-five pounds of the minus 60 mesh Demerara bauxite fines were charged to a pug mill. With the pugger operating, 0.54 pound of NaOH dissolved in 3.74 pounds of water (3% NaOH dosage) was slowly added to the charge. No balls appeared after 20 minutes pugging. When the V.M. of the mixture was reduced to 35.1% by addition of dry fines to the pugger and pugging for 20 minutes, dust-free balls were produced, of which 89% by weight of the balls were 4/10 mesh. After drying the balls at 300° F. for 2 hours and calcining them at 700° F. to a V.M. of 8.9%, the hardness of the 4/8 mesh fraction of the balls was only 2.4%, indicating that the pelleted fines, while spherical in shape, were very soft.

(b) Twenty-five pounds of the ground Demerara fines were pugged for 15 minutes with 2.31 pounds of a 15% NaOH solution (2% NaOH dosage). While pugging, 2.29 pounds of water were added in seven approximately equal increments with 4 minutes pugging after each addition. Total pugging time was 82 minutes. The pugger produced a very good assortment of balls. After drying the balls at 300° F. for 2 hours to a V.M. of 26.5%, and calcining them in a muffle furnace at 700° F. for ½ hour, the hardness value of the balls was 0%, indicating that the product had no attrition resistance.

I claim:
1. A method of producing hard spherical bauxite adsorbent pellets which comprises
incorporating a small amount of an aqueous solution of sodium hydroxide into bauxite fines while pugging said fines, thereby to coat said fines with said aqueous solution of sodium hydroxide,
said aqueous solution being employed in amount sufficient to provide a 1% to 6% sodium hydroxide dosage and being sufficiently concentrated that said fines do not form balls upon being pugged therewith,
while pugging said sodium hydroxide coated bauxite fines, gradually adding thereto water sufficient to agglomerate all of said sodium hydroxide coated bauxite fines into spherical pellets and, without washing said spherical pellets, calcining them out of direct contact with combustion gases at a temperature and for a time sufficient to reduce the volatile mat- ter content of said spheres to an amount within the range of about 1% to 15%.

2. The method of claim 1 wherein said pellets are calcined at a temperature within the range of 600° F. to 800° F.

3. The method of claim 1 wherein said sodium hydroxide dosage is within the range of 2% to 5%.

4. The method of claim 1 wherein said sodium hydroxide dosage is within the range of 3% to 4% and the concentration of said sodium hydroxide solution is within the range of 40% to 50%.

5. The method of claim 1 wherein said water is added in amount sufficient to adjust the volatile matter content of said bauxite fines and alkali solution to an amount within the range of about 33% to about 38%.

6. A method for producing hard spherical bauxite adsorbent pellets which comprises
pugging uncalcined bauxite fines with a 1% to 6% sodium hydroxide dosage in the form of a concentrated aqueous sodium hydroxide solution,
said sodium hydroxide solution being sufficiently concentrated so that a pulverulent mass of particles of sodium hydroxide coated bauxite fines is obtained,
while pugging said mass, slowly incorporating water thereto in amount sufficient to cause said mass to agglomerate into spherical pellets,
continuing pugging the mass after completion of water addition thereto until all of said mass has agglomerated into compact spherical pellets and,
without washing said spherical pellets, calcining said pellets out of direct contact with combustion gases at a temperature and for a time sufficient to reduce the volatile matter content thereof to an amount within the range of about 1% to 15%, thereby hardening said spheres.

7. A method for producing hard spherical bauxite adsorbent pellets which comprises
pugging uncalcined bauxite fines with a 2% to 5% sodium hydroxide dosage in the form of a concentrated sodium hydroxide solution,
said sodium hydroxide solution being sufficiently concentrated so that a pulverulent mass of particles of sodium hydroxide coated bauxite fines is obtained,
while pugging said mass, slowly incorporating water thereto in amount sufficient to cause said mass to agglomerate into spherical pellets,
continuing pugging the mass after completion of water addition thereto until all of said mass has agglomerated into compact spherical pellets and,
without washing said spherical pellets, calcining said pellets out of direct contact with combustion gases at a temperature and for a time sufficient to reduce the volatile matter content thereof to an amount within the range of 1% to 15%, thereby hardening said spheres.

8. The method of claim 7 wherein said sodium hydroxide is incorporated as an aqueous solution of about 40% to about 50% concentration.

9. A method for producing spherical bauxite adsorbent granules which comprises
pugging uncalcined bauxite fines with a 2% to 5% sodium hydroxide dosage in the form of an aqueous sodium hydroxide solution of about 40% to 50% concentration so as to obtain a pulverulent mixture,
while pugging said mixture, slowly adding sufficient water thereto to form a mass having a volatile matter content within the limits of about 33% to about 38%, whereby said mass gradually agglomerates into compact spherical pellets,
continuing pugging the mass after completion of water addition thereto until all of said mass has agglomerated into spherical pellets,
and, without washing said spherical pellets, calcining them out of direct contact with combustion gases at a temperature within the range of about 600° F. to about 1200° F. for a time sufficient to reduce the volatile matter content of said pellets to an amount within the range of about 6% to 10%.

10. A method for producing spherical bauxite adsorbent granules which comprises
pugging uncalcined bauxite fines with a 2% to 5% sodium hydroxide dosage in the form of an aqueous sodium hydroxide solution of about 40% to 50% concentration so as to obtain a pulverulent mixture,
while pugging said mixture, slowly adding sufficient water thereto to form a mass having a volatile matter content within the limits of about 33% to about 38%, whereby said mass gradually agglomerates into compact spherical pellets,
continuing pugging the mass after completion of water addition thereto until all of said mass has agglomerated into spherical pellets,
and, without washing said spherical pellets, calcining them in a reducing atmosphere at a temperature within the range of about 600° F. to about 1200° F. for a time sufficient to reduce the volatile matter content of said pellets to an amount within the range of about 6% to 10%.

References Cited by the Examiner

UNITED STATES PATENTS

| | | | |
|---|---|---|---|
| 2,391,116 | 12/1945 | Ashley | 252—455 |
| 2,881,051 | 4/1959 | Pingard | 23—313 |
| 2,952,644 | 9/1960 | Holden | 252—463 |
| 3,024,206 | 3/1962 | Duke | 252—477 |

TOBIAS E. LEVOW, *Primary Examiner.*

MAURICE A. BRINDISI, *Examiner.*